(12) United States Patent
Sun

(10) Patent No.: US 10,599,954 B2
(45) Date of Patent: Mar. 24, 2020

(54) METHOD AND APPARATUS OF DISCOVERING BAD CASE BASED ON ARTIFICIAL INTELLIGENCE, DEVICE AND STORAGE MEDIUM

(71) Applicant: BAIDU ONLINE NETWORK TECHNOLOGY (BEIJING) CO., LTD., Haidian District Beijing (CN)

(72) Inventor: Xiaoxiong Sun, Haidian District Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 107 days.

(21) Appl. No.: 15/961,721

(22) Filed: Apr. 24, 2018

(65) Prior Publication Data

US 2018/0322370 A1 Nov. 8, 2018

(30) Foreign Application Priority Data

May 5, 2017 (CN) .......................... 2017 1 0311895

(51) Int. Cl.
*G06F 15/76* (2006.01)
*G06F 17/27* (2006.01)
(Continued)

(52) U.S. Cl.
CPC ........... *G06K 9/6264* (2013.01); *G06F 15/76* (2013.01); *G06F 40/295* (2020.01);
(Continued)

(58) Field of Classification Search
CPC ............................... G06F 17/27; G06F 17/278
See application file for complete search history.

(56) References Cited

U.S. PATENT DOCUMENTS

2003/0191625 A1* 10/2003 Gorin .................... G06F 17/278
704/1
2010/0306139 A1* 12/2010 Wu ........................ G06F 17/278
706/12

(Continued)

FOREIGN PATENT DOCUMENTS

| CN | 104182423 A | 12/2014 |
|---|---|---|
| CN | 105260360 A | 1/2016 |
| CN | 106503192 A | 3/2017 |

OTHER PUBLICATIONS

Pan, Yi-cheng, Yu-ying Liu, and Lin-shan Lee. "Named entity recognition from spoken documents using global evidences and external knowledge sources with applications on mandarin chinese." IEEE Workshop on Automatic Speech Recognition and Understanding, 2005 . . . IEEE, 2005. (Year: 2005).*

Chen, Conrad, and Hsi-Jian Lee. "A Three-Phase System for Chinese Named Entity Recognition." Proceedings of the 16th Conference on Computational Linguistics and Speech Processing. 2004. (Year: 2004).*

(Continued)

*Primary Examiner* — Paras D Shah
(74) *Attorney, Agent, or Firm* — Brooks Kushman PC

(57) ABSTRACT

The present disclosure provides a method and apparatus of discovering a bad case based on artificial intelligence, a device and a storage medium, wherein the method comprises: performing named entity recognition for a to-be-recognized query, and respectively obtaining a confidence level of each character in the query; respectively obtaining a probability value of each character of forming a word with a neighboring character in the query; determining whether there is a bad case according to the confidence level and the probability value. The solution of the present disclosure may be applied to save man power costs, and improve the processing efficiency and enhance a discovery rate of bad cases.

18 Claims, 4 Drawing Sheets

(51) Int. Cl.
*G06K 9/62* (2006.01)
*G06K 9/68* (2006.01)
*G06F 40/295* (2020.01)
*G06N 20/00* (2019.01)
*G06F 40/205* (2020.01)

(52) U.S. Cl.
CPC ......... *G06K 9/6265* (2013.01); *G06K 9/6885* (2013.01); *G06F 40/205* (2020.01); *G06N 20/00* (2019.01)

(56) References Cited

U.S. PATENT DOCUMENTS

2011/0264664 A1* 10/2011 Xiao .................. G06F 16/31
707/741
2018/0182382 A1* 6/2018 Lee .................. G06F 17/2785

OTHER PUBLICATIONS

Gao, Hong, Degen Huang, and Yuansheng Yang. "Word-level Chinese named entity recognition based on segmentation digraph." 2005 International Conference on Natural Language Processing and Knowledge Engineering. IEEE, 2005. (Year: 2005).*

Seok, Miran, et al. "Named entity recognition using word embedding as a feature." Int. J. Softw. Eng. Appl 10.2 (2016): 93-104. (Year: 2016).*

Zhang, Suxiang, et al. "Word segmentation and named entity recognition for SIGHAN Bakeoff3." Proceedings of the Fifth SIGHAN Workshop on Chinese Language Processing. 2006. (Year: 2006).*

Kuru, Onur, Ozan Arkan Can, and Deniz Yuret. "Charner: Character-level named entity recognition." Proceedings of COLING 2016, the 26th International Conference on Computational Linguistics: Technical Papers. 2016. (Year: 2016).*

Chinese named entity recognition combined active learning with self-training, by Zhong Zhinong, Liu Fangchi, Wu Ye, & Wu Jiangjiang; Journal of National University of Defense Technology, V.36 No. 4 Aug. 2014; 8 pages.

* cited by examiner

METHOD AND APPARATUS OF DISCOVERING BAD CASE BASED ON ARTIFICIAL INTELLIGENCE, DEVICE AND STORAGE MEDIUM

The present application claims the priority of Chinese Patent Application No. 2017103118954, filed on May 5, 2017, with the title of "Method and apparatus of discovering bad case based on artificial intelligence, device and storage medium".

FIELD OF THE DISCLOSURE

The present disclosure relates to artificial intelligence technologies, and particularly to a method and apparatus of discovering a bad case based on artificial intelligence, a device and a storage medium.

BACKGROUND OF THE DISCLOSURE

Artificial intelligence, as abbreviated as AI, is a new technical science for researching and developing theories, methods, technologies and application systems for simulating, extending and expanding human intelligence. Artificial intelligence is a branch of computer science and attempts to learn about the essence of intelligence, and produce a new intelligent machine capable of responding in a manner similar to human intelligence. The studies in the field comprise robots, language recognition, image recognition, natural language processing, expert systems and the like.

Named Entity Recognition (NER) is a sequence labelling task in Natural Language Processing (NLP). The sequence labelling refers to endowing a certain label to each symbol in the sequence, and mainly employs an implementation mode of statistics plus rules. The Named Entity Recognition may labels entities in a query according to classes such as person name, place name and time.

In practical application, it is necessary to look up to find situations of bad cases to perform optimized update for a Named Entity Recognition system.

In the prior art, situations of bad cases are mainly looked up and found in a manner of a person's operation, i.e., a person randomly samples recognition results of the Named Entity Recognition system, and reviews and analyzes the sampled recognition results to determine whether there are bad cases.

The above manner at least has the following problems: since operations need to be performed by a person, very high man power costs are needed and a processing efficiency is low. In addition, since random sampling is performed, all bad cases might not be found, i.e., a discovery rate of bad cases is very low, thereby affecting subsequent optimization and update of the named entity recognition system.

SUMMARY OF THE DISCLOSURE

In view of the above, the present disclosure provides a method and apparatus of discovering a bad case based on artificial intelligence, a device and a storage medium, which can save man power costs, improve the processing efficiency and enhance a discovery rate of bad cases.

Specific technical solutions are as follows:

A method of discovering a bad case based on artificial intelligence, comprising:

performing named entity recognition for a to-be-recognized query, and respectively obtaining a confidence level of each character in the query;

respectively obtaining a probability value of each character of forming a word with a neighboring character in the query;

determining whether there is a bad case according to the confidence level and the probability value.

According to a preferred embodiment of the present disclosure, before performing named entity recognition for the to-be-recognized query, the method further comprises:

training to obtain a probability value evaluating model;

the respectively obtaining a probability value of each character of forming a word with a neighboring character in the query comprises:

according to the probability value evaluating model, respectively determining the probability value of each character of forming a word with a neighboring character in the query.

According to a preferred embodiment of the present disclosure, the probability value evaluating model comprises a word embedding model.

According to a preferred embodiment of the present disclosure, the step of, according to the probability value evaluating model, respectively determining the probability value of each character of forming a word with a neighboring character in the query comprises:

considering each character in the query as a candidate character, and respectively performs the following processing for each candidate character:

determining a character which is spaced apart from a candidate character by less than or equal to M characters in the query as a neighboring character of the candidate character, M being a natural number;

segmenting the query to obtain a segment which comprises the candidate word and at least one neighboring character;

regarding each segment, determining a similar word similar to the segment and a similar probability value of each similar word according to the probability value evaluating model;

selecting a similar probability value with a maximum value as a probability value of the candidate character forming a word with the neighboring character.

According to a preferred embodiment of the present disclosure, the segmenting the query to obtain a segment which only comprises the candidate word and the neighboring character comprises:

for each neighboring word, determining a location of the neighboring character;

if the neighboring character is located before the candidate character, segmenting the query to obtain a segment starting from the neighboring character and ending at the candidate character;

if the neighboring character is located behind the candidate character, segmenting the query to obtain a segment starting from the candidate character and ending at the neighboring character.

According to a preferred embodiment of the present disclosure, the determining whether there is a bad case according to the confidence level and the probability value comprises:

considering each character in the query as a candidate character, and respectively performing the following processing for each candidate character:

calculating a difference between the confidence level of the candidate character and a preset first threshold to obtain a first difference, and determining a first parameter according to the first difference;

calculating a difference between a preset second threshold and the probability value corresponding to the candidate character to obtain a second difference, and determining a second parameter according to the second difference;

determining a third parameter according to the first parameter and the second parameter;

summating the third parameter corresponding to each candidate character in the query, comparing a sum with a preset third threshold, and determining a bad case if the sum is larger than the third threshold.

According to a preferred embodiment of the present disclosure, the determining the first parameter according to the first difference comprises:

if the first difference is larger than 0, setting a value of the first parameter as 1;

if the first difference is equal to 0, setting the value of the first parameter as 0;

if the first difference is smaller than 0, setting the value of the first parameter as −1;

the determining the second parameter according to the second difference comprises:

if the second difference is larger than 0, setting the value of the second parameter as 1;

if the second difference is equal to 0, setting the value of the second parameter as 0;

if the second difference is smaller than 0, setting the value of the second parameter as −1.

According to a preferred embodiment of the present disclosure, the determining the third parameter according to the first parameter and the second parameter comprises:

if both the first parameter and second parameter are smaller than 0, setting a value of the third parameter as 1, otherwise as 0;

a value of the third threshold is 1.

An apparatus for discovering a bad case based on artificial intelligence, comprising: a first obtaining unit, a second obtaining unit and a discovery unit;

the first obtaining unit is configured to perform named entity recognition for a to-be-recognized query, respectively obtain a confidence level of each character in the query, and send the confidence level to the discovery unit;

the second obtaining unit is configured to respectively obtain a probability value of each character of forming a word with a neighboring character in the query, and send the probability value to the discovery unit;

the discovery unit is configured to determine whether there is a bad case according to the confidence level and the probability value.

According to a preferred embodiment of the present disclosure, the apparatus further comprises: a model training unit;

the model training unit is configured to train to obtain and send a probability value evaluating model to the second obtaining unit;

the second obtaining unit, according to the probability value evaluating model, respectively determines the probability value of each character of forming a word with a neighboring character in the query.

According to a preferred embodiment of the present disclosure, the probability value evaluating model comprises a word embedding model.

According to a preferred embodiment of the present disclosure, the second obtaining unit considers each character in the query as a candidate character, and respectively performs the following processing for each candidate character:

determining a character which is spaced apart from a candidate character by less than or equal to M characters in the query as a neighboring character of the candidate character, M being a natural number;

segmenting the query to obtain a segment which comprises the candidate word and at least one neighboring character;

regarding each segment, determining a similar word similar to the segment and a similar probability value of each similar word according to the probability value evaluating model;

selecting a similar probability value with a maximum value as a probability value of the candidate character forming a word with the neighboring character.

According to a preferred embodiment of the present disclosure, for each neighboring word, the second obtaining unit determines a location of the neighboring character; if the neighboring character is located before the candidate character, segments the query to obtain a segment starting from the neighboring character and ending at the candidate character; if the neighboring character is located behind the candidate character, segments the query to obtain a segment starting from the candidate character and ending at the neighboring character.

According to a preferred embodiment of the present disclosure, the discovery unit considers each character in the query as a candidate character, and respectively performs the following processing for each candidate character:

calculating a difference between the confidence level of the candidate character and a preset first threshold to obtain a first difference, and determining a first parameter according to the first difference;

calculating a difference between a preset second threshold and the probability value corresponding to the candidate character to obtain a second difference, and determining a second parameter according to the second difference;

determining a third parameter according to the first parameter and the second parameter;

summating the third parameter corresponding to each candidate character in the query, comparing a sum with a preset third threshold, and determining a bad case if the sum is larger than the third threshold.

According to a preferred embodiment of the present disclosure, if the first difference is larger than 0, a value of the first parameter is 1;

if the first difference is equal to 0, the value of the first parameter is 0;

if the first difference is smaller than 0, the value of the first parameter is −1;

if the second difference is larger than 0, a value of the second parameter is 1;

if the second difference is equal to 0, the value of the second parameter is 0;

if the second difference is smaller than 0, the value of the second parameter is −1.

According to a preferred embodiment of the present disclosure, if both the first parameter and second parameter are smaller than 0, a value of the third parameter is 1, otherwise the value is 0;

a value of the third threshold is 1.

A computer device, comprising a memory, a processor and a computer program which is stored on the memory and runs on the processor, the processor, upon executing the program, implementing the above-mentioned method.

A computer-readable storage medium on which a computer program is stored, the program, when executed by a processor, implementing the aforesaid method.

As can be seen from the above introduction, according to solutions of the present disclosure, named entity recognition is performed for a to-be-recognized query and a confidence level of each character in a query is respectively obtained, then a probability value of each character of forming a word with a neighboring character in the query is obtained, and then whether there is a bad case is determined according to the obtained confidence level and the probability value. As compared with the prior art, the solutions of the present disclosure needn't employ manual operations, save man power costs, and improve the processing efficiency. Furthermore, processing is performed for each to-be-recognized query in the above manner, thereby avoiding occurrence of failure to find bad cases as much as possible and improving a discovery rate of the bad cases.

DETAILED DESCRIPTION OF PREFERRED EMBODIMENTS

With respect to problems existing in the prior art, the present disclosure provides a scheme of discovering a named entity recognition bad case based on active learning, namely, discovering (looked up to find) a bad case by combining a known named entity recognition system by an active learning method.

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
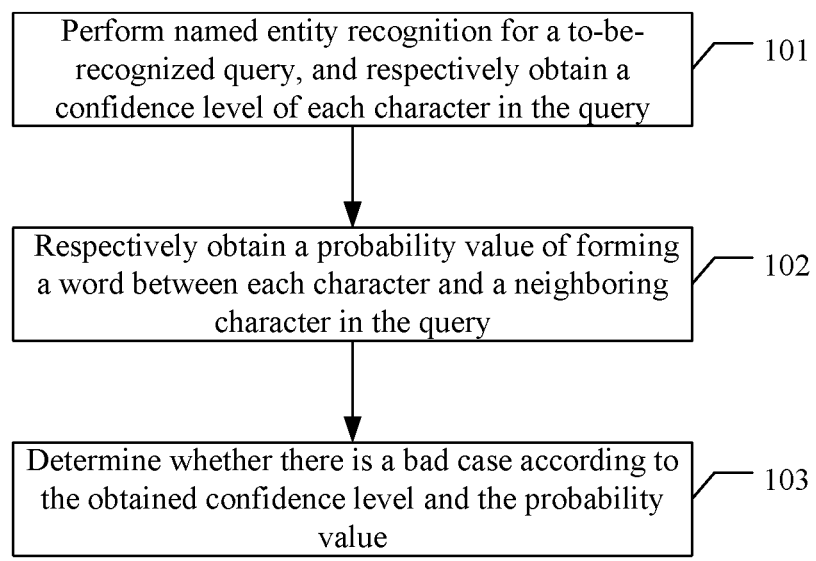
FIG. 1 is a flow chart of an embodiment of a method of discovering a bad case based on artificial intelligence according to the present disclosure.

FIG. 1 is a flow chart of an embodiment of a method of discovering a bad case based on artificial intelligence according to the present disclosure. As shown in FIG. 1, the embodiment comprises the following specific implementation mode.

101 relates to performing named entity recognition for a to-be-recognized query and respectively obtaining a confidence level of each character in the query.

The to-be-recognized query is an unlabeled query.

Regarding the to-be-recognized query, a current named entity recognition system may be used to recognize the query to obtain a recognition result.

According to the prior art, a confidence level of each character in the query may be obtained. The confidence level refers to a label confidence level. The label refers to an NE label to be recognized by the named entity recognition system.

For example, regarding the query "明(ming) 天(tian) 去(qu) 北(bei) 京(Jing)", the confidence level of each word therein may be obtained according to the prior art.

In 102, a probability value of each character of forming a word with a neighboring character in the query is obtained.

It is feasible to pre-train to obtain a probability value evaluating model, for example, a word embedding model.

As such, regarding each word in the query, the probability value of the character of forming a word with a neighboring character in the query may be obtained according to the word embedding model obtained from the training.

A large number of queries meeting requirements may be selected as training samples to train to obtain the word embedding model.

The queries meeting requirements may refer to queries which have high confidence levels and normal meaning and word order.

For example, "明(ming) 天(tian) 去(qu) 北(bei) 京(jing)" is a query meeting requirements, and "我(wo) 车(che) 去(qu) 开(kai)" is not a query meeting requirements.

The larger the number of training samples is, the better performance can be achieved by the word embedding model obtained from the training.

How to train to obtain the word embedding model is of the prior art, for example, the word embedding model may be obtained by training using a word2vec tool.

After the word embedding model is obtained, it is feasible to respectively determine the probability value of each character of forming a word with a neighboring character in the query according to the model.

Figure 2:
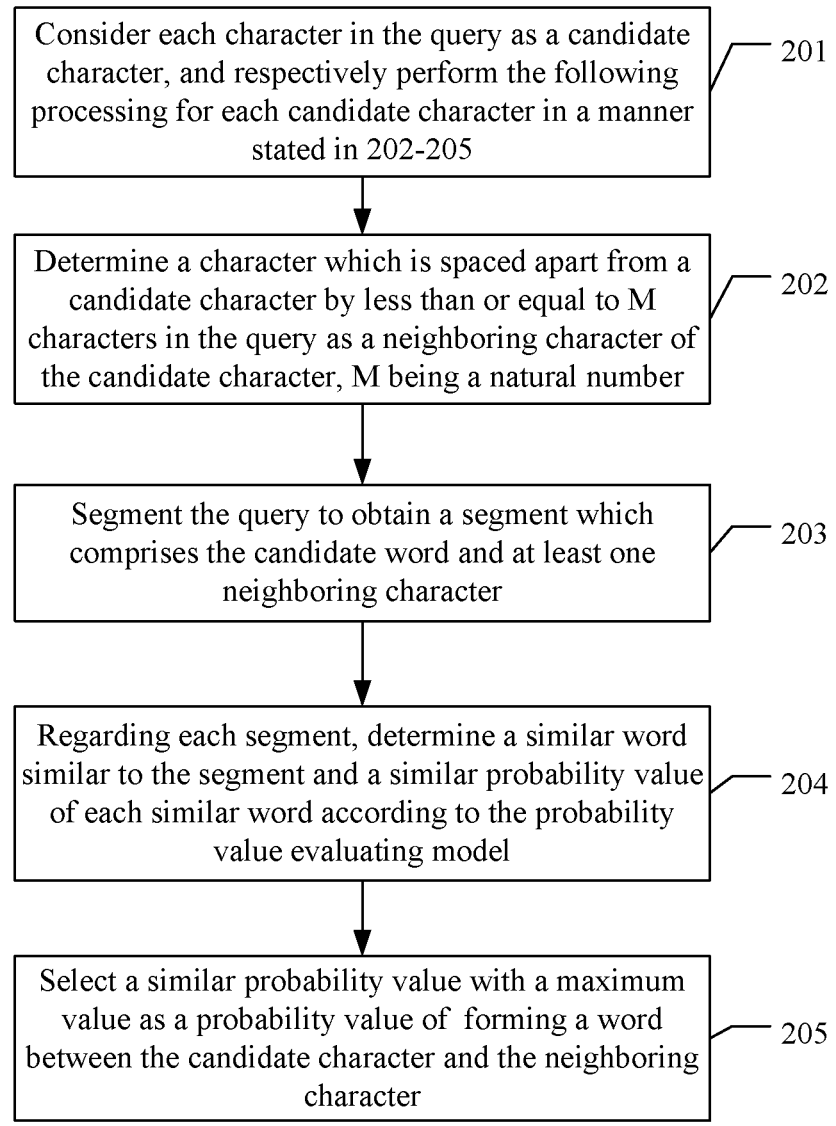
FIG. 2 is a flow chart of an embodiment of a method of determining a probability value of each character forming a word with a neighboring character in a query according to the present disclosure.

FIG. 2 is a flow chart of an embodiment of a method of determining a probability value of each character forming a word with a neighboring character in a query according to the present disclosure. As shown in FIG. 2, the embodiment comprises the following specific implementation mode.

In 201, each character in the query is considered as a candidate character, and processing is performed for each candidate character in the manner stated in 202-205.

For example, if the query is "明(ming) 天(tian) 去 qj(qu) 北(bei) 京(jing)", characters "明(ming)", "天(tian)", "去(qu)", "北(bei)" and "京(Jing)" therein all may be considered as candidate characters, and processing is performed for each candidate character in the manner stated in 202-205.

In 202, a character which is spaced apart from a candidate character by less than or equal to M characters in the query is determined as a neighboring character of the candidate character, M being a natural number.

A specific value of M may depend on actual needs, and it may be 0 or a positive integer.

For example, if the query is "明(ming) 天(tian) 去(qu) 北(bei) 京(jing)" and the value of M is 0, neighboring characters of the candidate character "夫(tian)" includes "明(ming)" and "去(qu)"; if the value of M is 1, neighboring characters of the candidate character "夫(tian)" include "明(ming)", "去(qu)" and "北(bei)".

In 203, the query is segmented to obtain a segment which comprises the candidate word and at least one neighboring character.

For example, the following processing may be performed for each neighboring character:

determining a location of the neighboring character;

if the neighboring character is located before the candidate character, segmenting the query to obtain a segment starting from the neighboring character and ending at the candidate character;

if the neighboring character is located behind the candidate character, segmenting the query to obtain a segment starting from the candidate character and ending at the neighboring character.

If the query is "明(ming) 天(tian) 去(qu) 北(bei) 京(jing)" and the value of M is 0, neighboring characters of the candidate character "天(tian)" includes "明(ming)" and "去(qu)", and correspondingly the obtained segments may include "明(ming) 天(tian)" and "天(tian) 去(qu)".

If the query is "我(wo) 要(yao) 去(qu) 餐(can) 厅(ting) 吃(chi) 饭(fan)" and if the value of M is 1, neighboring characters of the candidate character "餐(can)" therein include "厅(ting)", "吃(chi)", "要(yao)" and "去(bei)", and correspondingly, the obtained segments may include "餐(can) 厅(ting)", "餐(can) 厅(ting) 吃(chi)", "去(qu) 厅(can)" and "要(yao) (qu) 餐(can)".

It needs to be appreciated that the above segmenting manner is only for purpose of exemplary illustration and not intended to limit the technical solution of the present invention. In addition to the above manner, other segmenting manners may also be employed so long as the obtained segments only comprise the candidate character and the neighboring character, for example, the obtained segments may include, in addition to "餐(can) 厅(ting)", "餐(can) 厅(ting) 吃(chi)", "去(qu) 餐(can)" and "要(yao) 去(qu) 餐(can)", "去(qu) 餐(can) 厅(ting) 吃(chi)", "要(yao) 去(qu) 餐(can) 厅(ting)", "要(yao) (qu) 餐(can) 厅(ting) 吃(chi)" and the like. A specific segmenting manner may be flexibly set according to actual needs.

In 204, regarding each segment, determine a similar word similar to the segment and a similar probability value of each similar word according to the probability value evaluating model.

For example, it is feasible, for any segment a, respectively provide similar words similar to the segment a respectively through the word embedding model, and if word b, word c and word d are included, respectively provide similar probability values of the word b, word c and word d similar to the segment a. The number of provided similar words may depend on actual needs, for example, a fixed number of similar words are provided, or similar words with similar probability values larger than a predetermined threshold are provided. A specific implementation mode is not limited.

In 205, a similar probability value with a maximum value is selected as a probability value of the candidate character forming a word with the neighboring character.

For example, the candidate character is "天(tian)", and corresponding segments are "明(ming) 天(tian)" and "天(tian) 去(qu)". Assume three similar probability values are respectively obtained for each segment, it is feasible to select a similar probability value with a maximum value from the three similar probability values corresponding to "明(ming) 天(tian)", select a similar probability value with a maximum value from the three similar probability values corresponding to "天(tian) 去(qu)", then select a larger similar probability value from the selected two similar probability values, and consider the similar probability value as the probability value of the candidate character "天(tian)" forming a word with the neighboring character, namely, as the probability value corresponding to the candidate character "天(tian)".

In 103, whether there is a bad case is determined according to the obtained confidence level and the probability value.

Each character in the query may be considered as a candidate character, and the following processing is performed for each candidate character:

calculating a difference between the confidence level of the candidate character and a preset first threshold to obtain a first difference, and determining a first parameter according to the first difference;

calculating a difference between a preset second threshold and the probability value corresponding to the candidate character to obtain a second difference, and determining a second parameter according to the second difference;

determining a third parameter according to the first parameter and the second parameter;

summating the third parameter corresponding to each candidate character in the query, comparing the sum with a preset third threshold, and determining a bad case if the sum is larger than the third threshold.

Specific values of the first threshold, second threshold and third threshold may depend on actual needs.

Wherein a manner of determining the first parameter according to the first difference may be:

if the first difference is larger than 0, setting the value of the first parameter as 1;

if the first difference is equal to 0, setting the value of the first parameter as 0;

if the first difference is smaller than 0, setting the value of the first parameter as −1.

Similarly, a manner of determining the second parameter according to the second difference may be:

if the second difference is larger than 0, setting the value of the second parameter as 1;

if the second difference is equal to 0, setting the value of the second parameter as 0;

if the second difference is smaller than 0, setting the value of the second parameter as −1.

After the first parameter and second parameters are obtained respectively, the third parameter may be further determined. For example, if both the first parameter and second parameter are smaller than 0, the value of the third parameter is set as 1, otherwise set as 0.

Then, it is feasible to summate the third parameter corresponding to each candidate character in the query, and believe occurrence of a bad case if the sum is larger than 1.

The following formula may be obtained by concluding the above introduction:

$$f(\text{query}) = \sum_{w_i \in \text{query}} g(sgn(conf(w_i) - \varepsilon), sgn(\delta - \text{distance}(\beta_i))) \quad (1)$$

wherein $w_i$ represents a candidate character in the query;

$conf(w_i)$ represents a confidence level of the candidate character $w_i$, and $\varepsilon$ represents the first threshold;

distance($\beta_i$) represents a probability value of corresponding to the candidate character $w_i$, and $\delta$ represents the second threshold;

$$sgn(x) = \begin{cases} 1, & x > 0 \\ 0, & x = 0 \\ -1, & x < 0 \end{cases} \quad (2)$$

$$g(x, y) = \begin{cases} 1, & x < 0, \ y < 0 \\ 0, & \text{others} \end{cases}; \quad (3)$$

if f(query)>1, it is believed that a recognition result of the named entity recognition system for the query is wrong.

The first half of the formula (1) mainly reflects a height of the confidence level of the query, and the second half mainly reflects whether the meaning and word order in the query is normal.

It is feasible to, for the query with a recognition error (bad case), manually modify the recognition result into a correct recognition result, store a modification result as a training sample, and subsequently re-train a statistics model of the named entity recognition system according to accumulated training samples, namely, perform optimization and update for the statistics model so that the named entity recognition system performs named entity recognition according to the new statistics model, thereby improving the recognition efficiency.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

According to the above method embodiments, named entity recognition is performed for a to-be-recognized query and a confidence level of each character in a query is respectively obtained, then a probability value of each character of forming a word with a neighboring character in the query is obtained, and then whether there is a bad case is determined according to the obtained confidence level and the probability value. As compared with the prior art, the above method embodiments needn't employ manual operations, save man power costs, and improve the processing efficiency. Furthermore, processing is performed for each to-be-recognized query in the above manner, thereby avoiding occurrence of failure to find bad cases as much as possible and improving a discovery rate of the bad cases. In addition, the above method embodiments may all be applied to multiple tasks of NLP such as discovery of classification errors and discovery of word segmentation errors, and have extensive applicability.

The above introduces the method embodiments. The solution of the present disclosure will be further described through an apparatus embodiment.

Figure 3:
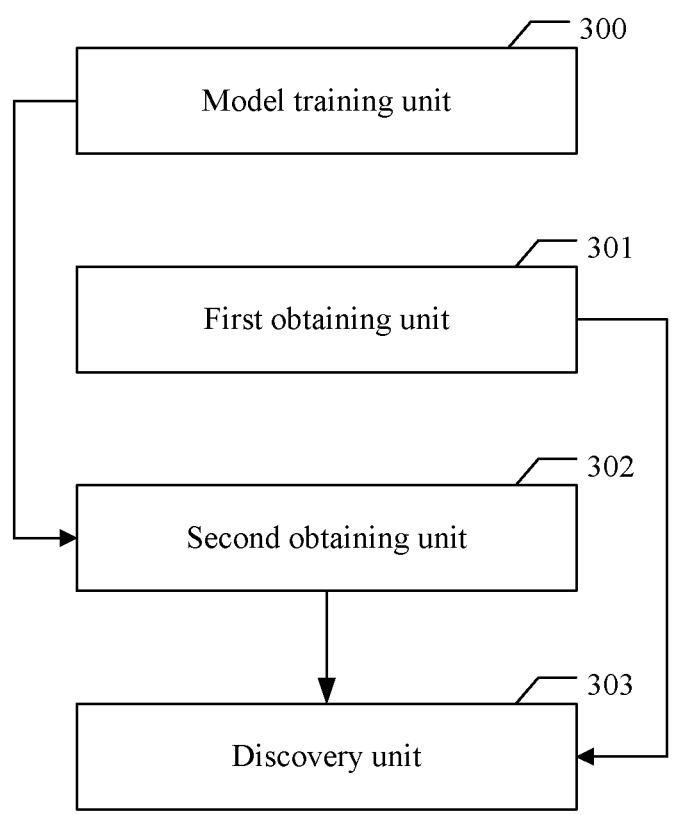
FIG. 3 is a structural schematic view of components of an embodiment of an apparatus for discovering a bad case based on artificial intelligence according to the present disclosure.

FIG. 3 is a structural schematic view of components of an embodiment of an apparatus for discovering a bad case based on artificial intelligence according to the present disclosure. As shown in FIG. 3, the apparatus comprises a first obtaining unit 301, a second obtaining unit 302 and a discovery unit 303.

The first obtaining unit 301 is configured to perform named entity recognition for a to-be-recognized query, respectively obtain a confidence level of each character in the query, and send the confidence level to the discovery unit 303.

The second obtaining unit 302 is configured to obtain a probability value of each character of forming a word with a neighboring character in the query, and send the probability value to the discovery unit 303.

The discovery unit 303 is configured to determine whether there is a bad case according to the confidence level and the probability value.

Regarding the to-be-recognized query, the first obtaining unit 301 may perform named entity recognition for it according to the prior art to obtain a recognition result.

According to the prior art, a confidence level of each character in the query may be obtained. The confidence level refers to a label confidence level.

In addition, the apparatus shown in FIG. 3 may further comprise: a model training unit 300.

The model training unit 300 is configured to train to obtain and send a probability value evaluating model to the second obtaining unit 302.

Correspondingly, the second obtaining unit 302 may, according to the probability value evaluating model, respectively determine the probability value of each character of forming a word with a neighboring character in the query.

For example, the probability value evaluating model may be a word embedding model.

Specifically, the second obtaining unit 302 may consider each character in the query as a candidate character, and respectively perform the following processing for each candidate character:

determining a character which is spaced apart from a candidate character by less than or equal to M characters in the query as a neighboring character of the candidate character, M being a natural number;

segmenting the query to obtain a segment which comprises the candidate word and at least one neighboring character;

regarding each segment, determining a similar word similar to the segment and a similar probability value of each similar word according to the probability value evaluating model;

selecting a similar probability value with a maximum value as a probability value of the candidate character forming a word with the neighboring character.

The second obtaining unit 302 may employ the following segmenting manner for each neighboring word:

determining a location of the neighboring character;

if the neighboring character is located before the candidate character, segmenting the query to obtain a segment starting from the neighboring character and ending at the candidate character;

if the neighboring character is located behind the candidate character, segmenting the query to obtain a segment starting from the candidate character and ending at the neighboring character.

It is feasible to, after the above processing, respectively obtain the confidence level of each character in the query and the corresponding probability value, and then the discovery unit 303 may determine whether there is a bad case according to the obtained confidence level and probability value.

Specifically, the discovery unit 303 may consider each character in the query as a candidate character, and respectively perform the following processing for each candidate character:

calculating a difference between the confidence level of the candidate character and a preset first threshold to obtain a first difference, and determining a first parameter according to the first difference;

calculating a difference between a preset second threshold and the probability value corresponding to the candidate character to obtain a second difference, and determining a second parameter according to the second difference;

determining a third parameter according to the first parameter and the second parameter;

summating the third parameter corresponding to each candidate character in the query, comparing a sum with a preset third threshold, and determining a bad case if the sum is larger than the third threshold.

wherein if the first difference is larger than 0, a value of the first parameter may be 1;

if the first difference is equal to 0, the value of the first parameter may be 0;

if the first difference is smaller than 0, the value of the first parameter may be −1.

similarly, if the second difference is larger than 0, a value of the second parameter may be 1;

if the second difference is equal to 0, the value of the second parameter may be 0;

if the second difference is smaller than 0, the value of the second parameter may be −1.

After the first parameter and second parameters are obtained respectively, the discovery unit 303 may further determine the third parameter, for example, if both the first parameter and second parameter are smaller than 0, the value of the third parameter is set as 1, otherwise set as 0.

Then, the discovery unit 303 may summate the third parameter corresponding to each candidate character in the query, and believe occurrence of a bad case if a sum is larger than 1.

The following formula may be obtained by concluding the above introduction:

$$f(\text{query}) = \sum_{w_i \in query} g(sgn(conf(w_i) - \varepsilon), sgn(\delta - \text{distance}(\beta_i))) \quad (1)$$

wherein $w_i$ represents a candidate character in the query;

$conf(w_i)$ represents a confidence level of the candidate character $w_i$, and $\varepsilon$ represents the first threshold;

$\text{distance}(\beta_i)$ represents a probability value of corresponding to the candidate character $w_i$, and $\delta$ represents the second threshold;

$$sgn(x) = \begin{cases} 1, & x > 0 \\ 0, & x = 0 \\ -1, & x < 0 \end{cases} \quad (2)$$

$$g(x, y) = \begin{cases} 1, & x < 0, \ y < 0 \\ 0, & \text{others} \end{cases} \quad (3)$$

if f(query)>1, it is believed that a recognition result of the named entity recognition system for the query is wrong.

Reference may be made to corresponding depictions in the aforesaid method embodiment for a specific workflow of the apparatus embodiment shown in FIG. 3. The workflow is not detailed any more.

According to the above apparatus embodiment, named entity recognition is performed for a to-be-recognized query and a confidence level of each character in a query is respectively obtained, then a probability value of each character of forming a word with a neighboring character in the query is obtained, and then whether there is a bad case is determined according to the obtained confidence level and the probability value. As compared with the prior art, the above apparatus embodiment needn't employ manual operations, saves man power costs, and improves the processing efficiency. Furthermore, processing is performed for each to-be-recognized query in the above manner, thereby avoiding occurrence of failure to find bad cases as much as possible and improving a discovery rate of the bad cases. In addition, the above embodiments may all be applied to multiple tasks of NLP such as discovery of classification errors and discovery of word segmentation errors, and have extensive applicability.

Figure 4:
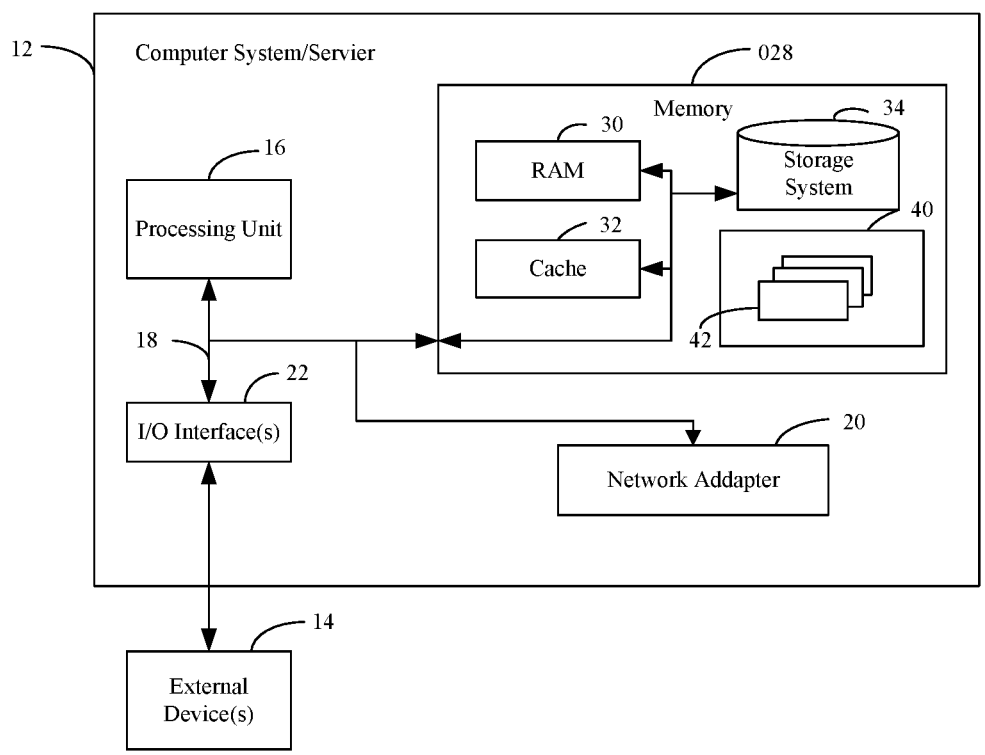
FIG. 4 illustrates a block diagram of an example computer system/server 12 adapted to implement an implementation mode of the present disclosure.

FIG. 4 illustrates a block diagram of an example computer system/server 12 adapted to implement an implementation mode of the present disclosure. The computer system/server 12 shown in FIG. 4 is only an example and should not bring about any limitation to the function and scope of use of the embodiments of the present disclosure.

As shown in FIG. 4, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 4 and typically called a "hard drive"). Although not shown in FIG. 4, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 4, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiments shown in FIG. 1 and FIG. 2, namely, performing named entity recognition for a to-be-recognized query and respectively obtaining a confidence level of each character in the query, obtaining a probability value of each character of forming a word with a neighboring character in the query, and determining whether there is a bad case according to the obtained confidence level and the probability value.

Reference may be made to related depictions in the above embodiments for specific implementations, which will not be detailed any more.

The present disclosure meanwhile provides a computer-readable storage medium on which a computer program is stored, the program, when executed by a processor, implementing the method stated in the embodiments shown in FIG. 1 and FIG. 2.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method of discovering a bad case based on artificial intelligence, wherein the method comprises:
performing named entity recognition for a to-be-recognized query, and respectively obtaining a confidence level of each character in the query;
respectively obtaining a probability value of each character of forming a word with a neighboring character in the query; and
determining whether there is a bad case according to the confidence level and the probability value,
wherein before the performing named entity recognition for a to-be-recognized query, the method further comprises:
training to obtain a probability value evaluating model;
the respectively obtaining a probability value of each character of forming a word with a neighboring character in the query comprises:
according to the probability value evaluating model, respectively determining the probability value of each character of forming a word with a neighboring character in the query,
and wherein the according to the probability value evaluating model, respectively determining the probability value of each character of forming a word with a neighboring character in the query comprises:
considering each character in the query as a candidate character, and respectively performing the following processing for each candidate character:
determining a character which is spaced apart from a candidate character by less than or equal to M characters in the query as a neighboring character of the candidate character, M being a natural number; and
segmenting the query to obtain a segment which comprises the candidate word and at least one neighboring character;
regarding each segment, determining a similar word similar to the segment and a similar probability value of each similar word according to the probability value evaluating model;
selecting a similar probability value with a maximum value as a probability value of the candidate character forming a word with the neighboring character.

2. The method according to claim 1, wherein the probability value evaluating model comprises a word embedding model.

3. The method according to claim 1, wherein the segmenting the query to obtain a segment comprises:
for each neighboring word, determining a location of the neighboring character;
if the neighboring character is located before the candidate character, segmenting the query to obtain a segment starting from the neighboring character and ending at the candidate character;
if the neighboring character is located behind the candidate character, segmenting the query to obtain a segment starting from the candidate character and ending at the neighboring character.

4. The method according to claim 1, wherein the determining whether there is a bad case according to the confidence level and the probability value comprises:
considering each character in the query as a candidate character, and respectively performing the following processing for each candidate character:
calculating a difference between the confidence level of the candidate character and a preset first threshold to obtain a first difference, and determining a first parameter according to the first difference;
calculating a difference between a preset second threshold and the probability value corresponding to the candidate character to obtain a second difference, and determining a second parameter according to the second difference;
determining a third parameter according to the first parameter and the second parameter;
summating the third parameter corresponding to each candidate character in the query, comparing a sum with a preset third threshold, and determining a bad case if the sum is larger than the third threshold.

5. The method according to claim 4, wherein the determining a first parameter according to the first difference comprises:
if the first difference is larger than 0, setting a value of the first parameter as 1;
if the first difference is equal to 0, setting the value of the first parameter as 0;
if the first difference is smaller than 0, setting the value of the first parameter as −1;
the determining a second parameter according to the second difference comprises:
if the second difference is larger than 0, setting the value of the second parameter as 1;
if the second difference is equal to 0, setting the value of the second parameter as 0;
if the second difference is smaller than 0, setting the value of the second parameter as −1.

6. The method according to claim 5, wherein the determining the third parameter according to the first parameter and the second parameter comprises:
if both the first parameter and second parameter are smaller than 0, setting a value of the third parameter as 1, otherwise as 0;
a value of the third threshold is 1.

7. A computer device, comprising a memory, a processor and a computer program which is stored on the memory and runs on the processor, wherein the processor, upon executing the program, implements the following operation:
performing named entity recognition for a to-be-recognized query, and respectively obtaining a confidence level of each character in the query;
respectively obtaining a probability value of each character of forming a word with a neighboring character in the query; and
determining whether there is a bad case according to the confidence level and the probability value,
wherein before the performing named entity recognition for a to-be-recognized query, the method further comprises:
training to obtain a probability value evaluating model;
the respectively obtaining a probability value of each character of forming a word with a neighboring character in the query comprises:
according to the probability value evaluating model, respectively determining the probability value of each character of forming a word with a neighboring character in the query,
and wherein the according to the probability value evaluating model, respectively determining the probability value of each character of forming a word with a neighboring character in the query comprises:

considering each character in the query as a candidate character, and respectively performing the following processing for each candidate character:
determining a character which is spaced apart from a candidate character by less than or equal to M characters in the query as a neighboring character of the candidate character, M being a natural number;
segmenting the query to obtain a segment which comprises the candidate word and at least one neighboring character;
regarding each segment, determining a similar word similar to the segment and a similar probability value of each similar word according to the probability value evaluating model; and
selecting a similar probability value with a maximum value as a probability value of the candidate character forming a word with the neighboring character.

8. The computer device according to claim 7, wherein the probability value evaluating model comprises a word embedding model.

9. The computer device according to claim 7, wherein the segmenting the query to obtain a segment comprises:
for each neighboring word, determining a location of the neighboring character;
if the neighboring character is located before the candidate character, segmenting the query to obtain a segment starting from the neighboring character and ending at the candidate character;
if the neighboring character is located behind the candidate character, segmenting the query to obtain a segment starting from the candidate character and ending at the neighboring character.

10. The computer device according to claim 7, wherein the determining whether there is a bad case according to the confidence level and the probability value comprises:
considering each character in the query as a candidate character, and respectively performing the following processing for each candidate character:
calculating a difference between the confidence level of the candidate character and a preset first threshold to obtain a first difference, and determining a first parameter according to the first difference;
calculating a difference between a preset second threshold and the probability value corresponding to the candidate character to obtain a second difference, and determining a second parameter according to the second difference;
determining a third parameter according to the first parameter and the second parameter;
summating the third parameter corresponding to each candidate character in the query, comparing a sum with a preset third threshold, and determining a bad case if the sum is larger than the third threshold.

11. The computer device according to claim 10, wherein the determining a first parameter according to the first difference comprises:
if the first difference is larger than 0, setting a value of the first parameter as 1;
if the first difference is equal to 0, setting the value of the first parameter as 0;
if the first difference is smaller than 0, setting the value of the first parameter as −1;
the determining a second parameter according to the second difference comprises:
if the second difference is larger than 0, setting the value of the second parameter as 1;
if the second difference is equal to 0, setting the value of the second parameter as 0;
if the second difference is smaller than 0, setting the value of the second parameter as −1.

12. The computer device according to claim 11, wherein the determining the third parameter according to the first parameter and the second parameter comprises:
if both the first parameter and second parameter are smaller than 0, setting a value of the third parameter as 1, otherwise as 0;
a value of the third threshold is 1.

13. A non-transitory computer-readable storage medium on which a computer program is stored, wherein the program, when executed by a processor, implements the following operation:
performing named entity recognition for a to-be-recognized query, and respectively obtaining a confidence level of each character in the query;
respectively obtaining a probability value of each character of forming a word with a neighboring character in the query; and
determining whether there is a bad case according to the confidence level and the probability value,
wherein before the performing named entity recognition for a to-be-recognized query, the method further comprises:
training to obtain a probability value evaluating model;
the respectively obtaining a probability value of each character of forming a word with a neighboring character in the query comprises:
according to the probability value evaluating model, respectively determining the probability value of each character of forming a word with a neighboring character in the query,
and wherein the according to the probability value evaluating model, respectively determining the probability value of each character of forming a word with a neighboring character in the query comprises:
considering each character in the query as a candidate character, and respectively performing the following processing for each candidate character:
determining a character which is spaced apart from a candidate character by less than or equal to M characters in the query as a neighboring character of the candidate character, M being a natural number;
segmenting the query to obtain a segment which comprises the candidate word and at least one neighboring character;
regarding each segment, determining a similar word similar to the segment and a similar probability value of each similar word according to the probability value evaluating model; and
selecting a similar probability value with a maximum value as a probability value of the candidate character forming a word with the neighboring character.

14. The non-transitory computer-readable storage medium according to claim 13, wherein
the probability value evaluating model comprises a word embedding model.

15. The non-transitory computer-readable storage medium according to claim 13, wherein
the segmenting the query to obtain a segment comprises:
for each neighboring word, determining a location of the neighboring character;
if the neighboring character is located before the candidate character, segmenting the query to obtain a segment starting from the neighboring character and ending at the candidate character;

if the neighboring character is located behind the candidate character, segmenting the query to obtain a segment starting from the candidate character and ending at the neighboring character.

16. The non-transitory computer-readable storage medium according to claim 13, wherein
the determining whether there is a bad case according to the confidence level and the probability value comprises:
considering each character in the query as a candidate character, and respectively performing the following processing for each candidate character:
calculating a difference between the confidence level of the candidate character and a preset first threshold to obtain a first difference, and determining a first parameter according to the first difference;
calculating a difference between a preset second threshold and the probability value corresponding to the candidate character to obtain a second difference, and determining a second parameter according to the second difference;
determining a third parameter according to the first parameter and the second parameter;
summating the third parameter corresponding to each candidate character in the query, comparing a sum with a preset third threshold, and determining a bad case if the sum is larger than the third threshold.

17. The non-transitory computer-readable storage medium according to claim 16, wherein
the determining a first parameter according to the first difference comprises:
if the first difference is larger than 0, setting a value of the first parameter as 1;
if the first difference is equal to 0, setting the value of the first parameter as 0;
if the first difference is smaller than 0, setting the value of the first parameter as −1;
the determining a second parameter according to the second difference comprises:
if the second difference is larger than 0, setting the value of the second parameter as 1;
if the second difference is equal to 0, setting the value of the second parameter as 0;
if the second difference is smaller than 0, setting the value of the second parameter as −1.

18. The non-transitory computer-readable storage medium according to claim 17, wherein
the determining the third parameter according to the first parameter and the second parameter comprises:
if both the first parameter and second parameter are smaller than 0, setting a value of the third parameter as 1, otherwise as 0;
a value of the third threshold is 1.

* * * * *